Patented Nov. 20, 1945

2,389,541

UNITED STATES PATENT OFFICE 2,389,541

FOUNDRY COMPOSITION

Arnold Edward Pavlish and Chester Ronald Austin, Columbus, Ohio, assignors, by mesne assignments, to Peerpatco, Incorporated, Indiana, Pa., a corporation of Delaware No Drawing. Application July 23, 1943,
Serial No. 495,901

4 Claims. (Cl. 22—217)

Our invention relates to foundry compositions and to the arts of producing and utilizing those compositions.

An object of our invention is the provision, in simple, inexpensive, and expeditious manner, and with a minimum of complexity of procedural steps, from materials of common occurrence and which are readily available, a foundry composition which has high green strength with moderate desired dry strength, which is permeable to the gases, vapors and fumes encountered in actual foundry practice, which has a high sintering point, and which at the same time does not cake or harden in use whereby it may be readily recovered for repeated use.

Other objects in part will be obvious, and in part will be pointed out hereinafter.

Our invention, accordingly, consists in the combination of elements, mixture of materials, and composition of ingredients, and in the several operational steps, and in the relation of each of the same to one or more of the others, all as described herein, the scope of the application of which is indicated in the following claims.

In order that our invention will be more readily understood, it is advantageous at this point to note that the usual method according to practice heretofore in vogue of forming molds and the like for foundry use has been to add a suitable bonding clay to silica sand. A moderate amount of water is added thereto. Mixing produces a moist, workable mass. In some instances a certain quantity of burnt or bonded sand replaces a corresponding amount of clean sand.

The composition thus prepared has been used for general foundry purposes. In the formation of a mold, for example, the pattern is first placed in a molding flask, whereupon the mold composition is rammed tightly about the pattern. The high strength which is required in such cases, particularly in the upper half of the mold, or the cope, is imparted by the clay. It is found that when sufficient clay is employed, the composition has such strength that dropping, breaking or disintegration of the mold is effectively prevented upon drawing the pattern, or during subsequent handling. Moreover, the clay imparts improved workability to the composition.

Thus, many desirable qualities are directly attributable to the addition of clay to the sand in the composition. Nevertheless, for many reasons, as will be pointed out herein, the presence of a large quantity of clay in the composition is highly disadvantageous. For one thing, the bonding agent is found to cause notable decrease in the porosity or permeability of the composition. Now, this permeability of the mold is essential for insuring that the gases, fumes and vapors attendant upon pouring the molten metal into the mold escape quickly and properly through the walls of the mold.

Many factors control the determination of the quantity of clay which must be added according to the known practices. Sands consisting of rough, irregular grains require less bonding material than do sands of smooth, rounded grains. Fine-grained sands require less binder than do the coarse sands. Small light work can be handled with comparatively weak sand. On the other hand, large work requires a strong, self-sustaining mold. The type of sand employed thus exerts a strong influence on the amount of required clay. As a further illustration, it may be noted that when part of the sand comprises burnt or used sand, then since some clay is already present in the used material, and since this clay is reversible in character, less added clay is required. In general, the amount of bonding agent employed ranges from about 5% to about 30% by weight of the foundry composition.

Many types of clays have been found to be reasonably satisfactory for foundry practice. Thus, non-refractory clays have been found suitable for certain types of work. Usually, however, fire clays, clays consisting largely of kaolinite, are employed. These non-refractory clays are commonly of the glacial age, and predominate in minerals of the sericite or illite (micaceous) type. It has previously been commented herein that one of the principal disadvantages of the use of the known clays is that a large quantity of clay is required and that such large quantity results in notable decrease in the porosity of the mold or similar article produced from a composition embodying the clay. It may also be noted that the inclusion of such clays in the foundry composition produces only a small increase in the strength of the article formed therefrom. Appreciable increase in strength can be achieved only by the use of a substantial quantity of clay, with attendant decrease in permeability, as heretofore set forth. For these reasons, therefore, compromise has heretofore been required between the factors of strength and permeability, with final results which were satisfactory from neither standpoint. Thus, while such clays are readily available in numerous localities throughout the country, nevertheless the workers in the art have been active in seeking foundry compositions, the cost of which is maintained within reasonable and practicable limitations, but which at the same time combine the essential factors of high permeability and high green strength, with but moderate and controlled dry strength.

In comparatively recent years, the research workers active in the art have found that in many types of foundry compositions western bentonite displays many highly advantageous characteristics when the material is employed as a bonding agent. The most important of these is high permeability. This clay is characterized, however, by its high dry strength and its tendency to swell appreciably when water is added thereto. This clay is of the swelling, colloidal type. A composition employing the same, after the admixture of water thereto, is found to be gummy and tacky. Thus it rams about the pattern only with considerable difficulty, and has a tendency to swell, cut and scab. Its high dry strength results in loss of sand in the discarded molds, due in large measure to lumpy particles. Since the expansion coefficient of a composition employing this binder is appreciably less than that of the metal, its high dry strength causes it to resist the shrinkage of the formed castings. By consequence cracked castings frequently occur when the mold is formed of compositions employing western bentonite as a binder.

During the development of this art, Norman J. Dunbeck, in his U. S. Patent No. 2,180,897, issued November 21, 1939, proposed a foundry composition employing southern bentonite as a bonding agent. Southern bentonite is there described as a non-swelling, colloidal montmorillonite, found in numerous parts of the United States, particularly in the South Central States. By colloidal clay, as the term is used in connection with foundry compositions, is indicated a clay consisting in large measure of extremely fine particles, such, for example, as one micron or less. This montmorillonite clay binder, as compared with binders theretofore available, is well suited for molds where the pattern has considerable detail, since compositions employing this binder display high green strength with a comparatively low dry strength. The low dry strength permits the formed castings to contract during cooling without appreciable restraint. Good, sound castings result.

It is to be noted from the foregoing discussion of both western and southern bentonites that the primary objective has always been the achievement of high green strength in the mold composition, mold permeance being retained unimpaired, and if possible, improved in value. The highest possible green strength is always desired by foundrymen, and efforts are constantly being directed towards improvement in that value. High green strength insures faithful reproduction of the pattern detail. Moreover, increased green strength permits increase in permeance inasmuch as smaller quantities of bonding agent can be employed while retaining the green strength unimpaired. Less dead clay and fines in the sand attend upon increase in green strength of the mold composition. Other advantages are achieved which will be apparent to those skilled in the art.

It is essential, however, in all such foundry practice, that the expense be maintained low. Increase in green strength achieved only by appreciable increase in cost would be impractical from an economic standpoint.

An important object of our invention, therefore, is the production of a foundry composition, together with the art of preparing the same, in which, with a minimum of expense and a minimum of added operational steps, the quantity of bonding agent is appreciably reduced and which composition is characterized by high green strength with but moderate dry strength and by the fact that its use permits the production of good, sound castings which faithfully adhere to the pattern detail and which are free from surface defects.

In our co-pending application, Serial No. 495,898, filed July 23, 1943, and entitled Foundry composition, we have disclosed treating southern bentonite or other suitable refractory clays with boric acid in order to achieve appreciable increase in the green strength of a foundry composition embodying of binder, thus increasing the mold permeance. In our co-pending application, Serial No. 495,899, filed July 23, 1943, and entitled Foundry composition, we have disclosed blending southern bentonite or suitable refractory clay with one or more of the sulphates of calcium for similar purposes. Similarly, in our co-pending application, Serial No. 495,900, filed July 23, 1943, and entitled Foundry composition, we have disclosed a manner of increasing still further the green strength of a foundry composition wherein southern bentonite, western bentonite, and refractory clays, either untreated or preliminarily treated with boric acid or the sulphates of calcium, are subjected to autoclaving or other pressure treatment over a considerable period of time.

The surprising and important discovery now follows upon our investigations that heat treatment of the bonding agent over a considerable period of time, before mixing of the sand and binder, gives rise to greatly improved green strength of the composition, with but little if any change in the dry strength thereof. This material improvement in green strength incident to heat treatment of the binder is observed where there are employed in the compositions both untreated bonding agents, such as southern bentonite, and treated binders, such as those described in our two co-pending applications first mentioned. Perhaps this improved green strength may be due to some change in the combined water of the clay. We are by no means certain, however, as to the correct explanation of the advantageous phenomenon attendant upon heat treatment of the binder, and the foregoing suggestion is entirely conjectural. Accordingly, we do not desire to be bound to this suggested theory.

The temperatures employed do not appear to be critical. Satisfactory results have been achieved with a wide range of temperatures. Similarly, increase in the duration of the heat treatment appears, in most cases, to be accompanied by only a moderate increase in the green strength of the foundry composition. These points will be expanded upon hereinafter.

In a typical instance of producing a foundry composition in accordance with the practice of our invention, a bond clay, such as southern bentonite, first is subjected to a suitable heat treatment, as, for example, in a gas-fired rotary kiln, at a selected moderate temperature, say at about 200° F. for a number of hours. Conveniently, the heat treatment may endure for from about four hours to about twelve hours. The binder is then ready for use in preparing the foundry composition.

To about 95% by weight of sand then is mixed about 5% by weight of southern bentonite, preliminarily heat-treated as noted, and this mixture is blended with a small quantity of water, say about 2½% by weight. This water content we maintain at a minimum, consistent with proper workability of the resulting mix. This is because the added water is the principal ingredient in the gases and vapors which are evolved when the molten metal is poured into the completed mold. Thus, while the water content may be conveniently varied from 2% to 5%, and good results have been achieved with a water content ranging between these limits, we prefer to employ about 2½% by weight of water in most cases.

The new mold composition thus produced is found to retain all the good qualities heretofore achieved in accordance with the practices set forth in our said three co-pending applications. Thus, for example, the composition flows readily and rams firmly and tightly about a pattern. The mold accurately follows the pattern details, and has a smooth, firm surface. Additionally, a mold produced from the new composition displays an appreciably higher green strength than do molds formed of a composition which has not been subjected to the described heat treatment. We have observed that because of this high green strength, the mold remains firmly in the cope of the flask when the pattern is drawn, and has an unbroken surface in large measure free from surface defects. Because of this, preliminary repair work on the mold is maintained at a minimum. As has been suggested, this high green strength permits the use of but a comparatively small quantity of bonding agent. Accordingly, the mold displays higher permeability than has heretofore been possible.

Illustratively, we have disclosed in the foregoing the use of southern bentonite as a bonding agent in the composition. We have also achieved, however, satisfactory results when this binder is comprised of western bentonite, kaolinite or fire clay and the like. It is equally feasible, in accordance with the practice of our invention, to employ a treated clay as the bonding agent. Thus, in a typical instance, the clay binder may consist of southern bentonite which has been preliminarily treated with from about 5% to about 30% by weight of boric acid or one or more of the materials selected from the group consisting of anhydrous calcium sulphate, plaster of Paris, or gypsum. In our two first-mentioned co-pending applications, it has been disclosed that a great improvement in the green strength of the resulting composition is achieved by the use of these treated bonding agents, as compared with the admixture of southern bentonite or other bonding clay alone. It is also disclosed in the first of these two said co-pending applications that treatment of the bonding agent with boric acid causes marked increase in the dry strength of the resulting foundry composition. It is a noteworthy feature of our invention, therefore, that when these treated clays are employed as binders, and are subjected to prolonged heat treatment in accordance with the practice of this invention, the resulting mold compositions show still further striking improvement in green strength.

These superior qualities attendant upon the treatment in accordance with the present invention are forcefully illustrated in the following table of test results. In carrying out these tests, sample foundry mixes were prepared in which either 95% or 90% green unbonded silica sand, as indicated, was mixed with either 5% or 10%, as indicated, of each bonding agent. Water in the amount of about 2½% was added. After mulling the ingredients in a laboratory muller, the compositions were tested in accordance with the procedure recommended in the publication of the American Foundrymen's Association:

| | Amount of binder in percent by weight of dry ingredients | Heated at 220° F. | Green compression strength | Dry compression strength |
|---|---|---|---|---|
| | | Hours | Lbs. per sq. in. | Lbs. per sq. in. |
| 1 | 5% southern bentonite | 4 | 9.8 | 46.0 |
| 2 | ----do---- | 12 | 13.03 | 48.3 |
| 3 | 5% mixture (85% southern bentonite, 15% boric acid) | 4 | 11.76 | 78.6 |
| 4 | 5% same mixture | 12 | 18.03 | 68.5 |
| 5 | 5% mixture (90% southern bentonite, 10% gypsum) | 4 | 13.62 | 48.7 |
| 6 | 5% same mixture | 12 | 15.48 | 46.0 |
| 7 | 10% kaolinite | 4 | 9.2 | 50.0 |
| 8 | ----do---- | 12 | 10.95 | 46.0 |
| 9 | 10% (94% kaolinite, 6% boric acid) | 4 | 12.42 | 89.5 |
| 10 | 10% same mixture | 12 | 12.78 | 90.5 |
| 11 | 10% (96% kaolinite, 4% gypsum) | 4 | 11.77 | 48.0 |
| 12 | 10% same mixture | 12 | 12.60 | 46.5 |

A comparison of tests 1 and 2 shows that where southern bentonite alone is employed as a binder a heat treatment of twelve hours at 220° F. achieves, for the foundry composition, a 33% increase in green strength over a similar heat treatment of the same binder for but four hours. Only a nominal increase in dry compression strength is observed. In tests 3 and 4, where 5% of a binding agent is employed, which binder consists of 85% southern bentonite treated with 15% boric acid, the twelve-hour heat treatment of the binder gives rise to about 44% increase in the green strength of the foundry composition, while at the same time bringing about a sharp drop in the dry strength.

Similarly, in tests 5 and 6, moderate increase in the green strength of the foundry composition is attendant upon prolonged heat treatment of the binder, while moderate decrease in dry strength is likewise observed. In this instance, it will be noted that 5% binder is employed, which binder comprises 90% southern bentonite with 10% gypsum.

In tests 7 and 8, fire clay (kaolinite) is employed as the binder. To achieve necessary initial green strength, 10% of this binder is required. Prolonged heat treatment of the binder is observed to increase appreciably the value of the green strength of the foundry composition, while some decrease in dry strength is likewise observed.

In tests 9 and 10, where 10% binder is employed, the binder itself comprising 94% by weight of kaolinite with 6% by weight of boric acid, prolonged heat treatment of the binder achieves some increase in green strength.

Finally, in tests 11 and 12, 10% binder being employed consisting of 96% kaolinite and 4% gypsum, a moderate increase in green strength of the composition attends upon prolonged heat treatment of the binder. While illustratively, the tests have been run at a temperature of about 220° F., we have found that the moderate temperatures employed may be varied within a wide range, and entirely satisfactory results achieved. For example, and purely by way of illustration, we have achieved notable success with a temperature of 200° F. In all these tests, the pressures have been atmospheric, but it is, of course, entirely possible to employ elevated pressures, where desired, as set forth in our copending application Serial No. 495,900. When elevated pressures are employed, a still further improvement in green strength is observed, incident to such increased pressure. Moreover, it is worthy of note that in all these instances, increased green strength is accompanied by no decrease in permeability. This contrasts in marked and important manner with the action of most bonding agents, wherein increase in green strength is attended by a proportionate and serious decrease in permeability.

While the proportion of bonding agent to sand in the illustrated cases has been given as either 5% or 10% by weight, considerable range in this value can be permitted with no detrimental effect. Thus, we have successfully employed from about 2% to about 10% by weight of the binder. Even further decrease in the lower limit of the percentage of binding agent can be employed where burnt sand comprises part of the sand content of the composition. Such burnt sand already contains some clay, and since, as we have already referred to hereinbefore, this clay is reversible in character and can be used over again, we have found that we can in such instance extend this lower range to as low as about ½% of the bonding agent.

Illustratively, we have described mixing of the silica sand with the bonding agent. It is entirely feasible, however, to mix together the various ingredients of the composition in any desired sequence. Thus the ingredients of the binder may be mixed together and the binder then mixed with the sand and water subsequently added. In another instance, all of the ingredients may be mixed together at one time; or any other suitable and desired sequence may be employed.

The rather limited dry strength of most of the compositions according to the present invention is advantageous in that it permits ready shaking of the sand from the flask after the formed casting has been rammed. Most of the sand can be subsequently recovered for further use. The metal of the casting is free to contract during cooling, due to the ready collapse of the sand in interior sections of the mold. As a consequence thereof, but little cracking of the castings is observed. The castings are readily cleaned, and savings can be achieved in the subsequent preparation of the castings for use.

While we have described the practice of our invention, for purposes of illustration, largely in connection with a green sand mold, it is particularly to be understood that the invention is equally applicable to dry sand molds. Likewise, it may be employed for green or dry sand cores or for similar foundry constructions. Similarly, although the invention has been described in its application to a foundry mold, it is to be noted that it is equally applicable to like compositions for other foundry uses. To illustrate, facing sands may be produced with binders treated in accordance with the practice of our invention, these facing sands consisting of various combinations of new or burnt silica sand, new or burnt molding sand, lake or bank sand, mixed with bonding clay, either treated or untreated, then subjected to prolonged heat treatment. We have successfully added to the foundry composition, where desired, small quantities of auxiliary bonding agents, such as cereal binders, cement, goulac (sulfite lye), pitch or rosin. Sea coal, wood flour, oils or other casting cleaning materials have been added with advantageous results.

It will be seen from a consideration of these illustrative cases that in all the instances described, and as well in many others which will readily suggest themselves to those skilled in the art following the teaching of this disclosure, we have achieved, with a minimum of added expense and with a minimum of added operational steps, a marked and important increase in green strength. Moreover, this increase in green strength is achieved without decrease in the permeability of the composition. No increase in dry strength is observed. In those cases where variation in dry strength takes place, it is noteworthy that the change has been in the nature of a decrease in dry strength. Only simple and inexpensive equipment is required to carry the new method of treatment into operation. In those instances where desired, we have been able to achieve required green strength with decrease in the quantity of bonding agent, as a result of which increased mold permeance can be obtained without departing from the required physical strength of the mold itself. Thus it will be seen that our new invention provides a new composition, an art of preparing the same, and an art of employing the composition, in all of which the various objects hereinbefore noted are all achieved together with a number of thoroughly practical advantages. Our new foundry composition is well adapted to withstand the many varying conditions of actual operational use in many applications.

As a large number of embodiments may be made of our invention and since many changes may be made in the embodiments hereinbefore set forth, it is to be understood that all matter described herein is to be interpreted illustratively and not in a limiting sense.

We claim:

1. In preparing a composition of matter for foundry purposes the art which comprises, in combination, subjecting dry pulverized southern bentonite bonding clay to treatment at temperatures of 200° F. or more for several hours, then blending with silica sand the heat-treated southern bentonite in the amount of ½% to 10% by weight.

2. In preparing a foundry binder, the art which comprises, subjecting one or more of the group consisting of dry pulverized montmorillonite and kaolinite bond clays to treatment at a temperature of 200° F. or more for a number of hours.

3. In preparing a foundry binder, the art which comprises, subjecting dry pulverized or ground montmorillonite bonding clay to treatment in a gas-fired kiln at a temperature of 200° F. or more for a period of about four hours or more.

4. In preparing a foundry binder, the art which comprises, subjecting one or more of the group consisting of dry pulverized montmorillonite and kaolinite bonding treated with 5% to 30% by weight of boric acid to treatment at a temperature of 200° F. or more for several hours.

ARNOLD EDWARD PAVLISH.
CHESTER RONALD AUSTIN.